(12) United States Patent
Zihlmann

(10) Patent No.: US 6,382,866 B1
(45) Date of Patent: May 7, 2002

(54) PERPENDICULAR CONNECTION OF PROFILE RODS

(75) Inventor: Siegfried Zihlmann, Wurenlos (CH)

(73) Assignee: Zihlmann Engineering, Wurenlos (CH)

(*) Notice: Subject to any disclaimer, the term of this patent is extended or adjusted under 35 U.S.C. 154(b) by 0 days.

(21) Appl. No.: 09/594,676

(22) Filed: Jun. 16, 2000

(30) Foreign Application Priority Data

Jun. 17, 1999 (EP) .............................. 99810536

(51) Int. Cl.[7] .................................................. F16B 9/00
(52) U.S. Cl. ...................................... 403/255; 403/252
(58) Field of Search ................................. 403/252, 254, 403/255, 256, 258, 259, 261, 262, 230, 297, 371, 187

(56) References Cited

U.S. PATENT DOCUMENTS

| 1,688,087 | A | | 10/1928 | Mirzan |
|---|---|---|---|---|
| 4,481,702 | A | * | 11/1984 | Mitchell .................. 403/297 X |
| 4,781,486 | A | * | 11/1988 | Mochizuki .............. 403/371 X |
| 5,173,001 | A | * | 12/1992 | Schunke .................... 403/252 |
| 5,192,145 | A | | 3/1993 | Rixen et al. |
| 5,209,598 | A | * | 5/1993 | Zullig ........................ 403/455 |
| 5,741,083 | A | * | 4/1998 | Schvartz ..................... 403/297 |
| 5,746,535 | A | * | 5/1998 | Kohler ........................ 403/258 |
| 5,785,359 | A | * | 7/1998 | Nagai et al. ............. 403/255 X |
| 5,931,599 | A | * | 8/1999 | Kuenzi .................... 403/297 X |

FOREIGN PATENT DOCUMENTS

| DE | 41 42 273 | 7/1993 |
|---|---|---|
| DE | 43 26 642 | 2/1995 |
| DE | 43 43 381 | 6/1995 |
| EP | 0 329 074 | 8/1989 |

* cited by examiner

Primary Examiner—Harry C. Kim
(74) Attorney, Agent, or Firm—Bachman & LaPointe, P.C.

(57) ABSTRACT

A perpendicular connection of two profile rods abutting at an angle ($\alpha$) with undercut linear grooves has a connecting bolt with a head at one end. This is arranged parallel to the axis of symmetry of a longitudinal profile rod in an undercut linear groove therein, and engages with its other end in a tenon block arranged in an undercut linear groove of the transverse profile rod. A spread element inserted in the undercut linear groove can be spread by the effect of an axial force generated by the connecting bolt transverse to the linear groove and firmly clamped in this as an abutment. The spread element comprises a spread body with an axial holder bore and a wedge body which can be inserted therein with the through bore for the connecting bolt, where the head of the connecting bolt lies against a face of the wedge body.

11 Claims, 4 Drawing Sheets

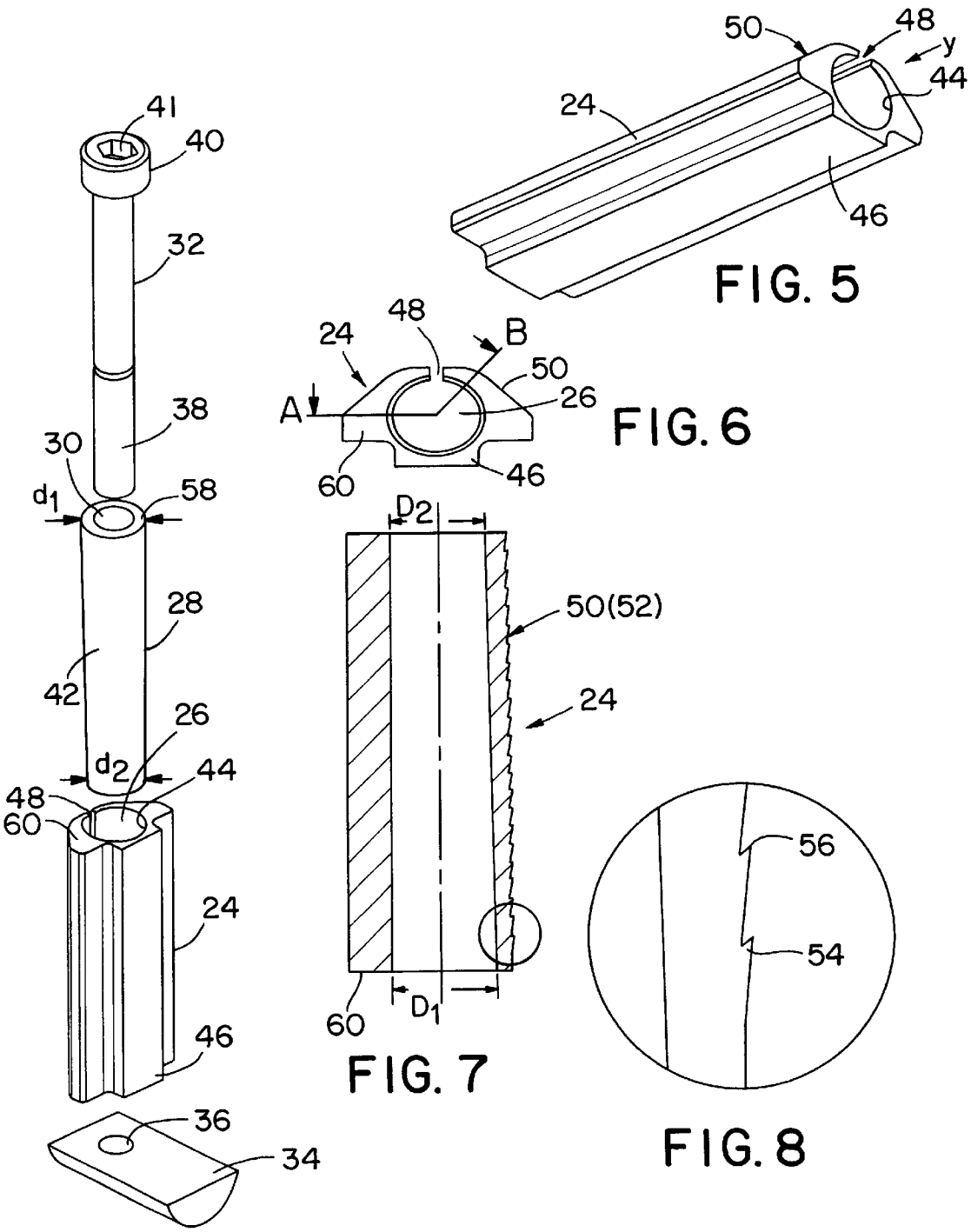

PERPENDICULAR CONNECTION OF PROFILE RODS

BACKGROUND OF THE INVENTION

The invention concerns a perpendicular connection of two profile rods with undercut linear grooves abutting at an angle, with a connecting bolt which has a head at one end and is arranged parallel to the axis of symmetry of a longitudinal profile rod and arranged in an undercut linear groove therein, and with its other end engages in a tenon block arranged in an undercut linear groove of the transverse profile rod and with its head engages behind a spread element with a through bore for the connecting bolt inserted in the undercut linear groove where, under the effect of an axial force which can be exerted by the connecting bolt, the spread element can be spread transverse to the linear groove and firmly clamped in this as an abutment.

DE-A 3438773 describes a perpendicular connection with a connecting bolt of two profile rods with undercut linear grooves abutting at right angles. The connecting bolt is arranged parallel to the axis of symmetry of a longitudinal profile rod in an undercut linear groove therein and with its end remote from the bolt head engages in a tenon block arranged in an undercut linear groove of the transverse profile rod. With its head the connecting bolt engages behind a cylindrical abutment piece which is fitted, axially fixed, in the undercut linear groove of the profile rod and has a through bore for the connecting bolt. For assembly it is necessary to produce cylindrical recesses in the connecting profile rod to be connected, across its length, in order to be able to accommodate the cylindrical abutment piece. Furthermore, a fixing point is always marked by the evident cylindrical abutment piece. Finally, once fitted with cylindrical transverse bores, a profile rod can no longer be re-used universally as the transverse bores always remain evident.

DE-A 4016320 discloses a perpendicular connection of profile rods which is based on the perpendicular connection described in DE-A-3438773, with a cylindrical abutment piece which can be inserted in the linear groove. The external diameter of the cylindrical abutment piece is adapted to the cross-section of the undercut linear groove of the profile rod so that a thread applied on the outer periphery of the cylindrical abutment piece acts as a self-tapping thread engaging in the material of the profile rod. In this perpendicular connection the cylindrical recesses on the long sides of the profile rod to be connected can be omitted. One substantial disadvantage of the perpendicular connection with an abutment piece with self-tapping thread, however, is that because of the thread to be cut, insertion of the abutment pieces requires a great force which quickly leads to fatigue and pain in the wrist of the fitter who produces several perpendicular connections in succession.

DE-A-4343381 discloses a connecting element for production of a perpendicular connection of profile rods of the type described initially, with a spread element. The spread element consists of two spread parts which face each other with wedge surfaces running obliquely to the longitudinal axis of the connecting bolt at an angle of 45°. A substantial disadvantage of this connection type is that due to the asymmetric spread, locally different contact forces are generated between the spread body and the linear groove which in total leads to inadequate fixing of the spread body in the linear groove.

SUMMARY OF THE INVENTION

The invention is therefore based on the task of creating a perpendicular connection of the type described initially with which a good clamping effect can be achieved.

The task is solved according to the invention in that the spread element comprises a spread body with an axial holder bore and a wedge body which can be inserted therein, with a through bore for the connecting bolt, where the head of the connecting bolt lies against a face of the wedge body.

This symmetrical arrangement of two interlinking parts of the spread element gives a force effect which is evenly distributed over the surface of the spread body and which even at low tightening torques of the connecting bolt leads to a high surface pressure and hence excellent clamping of the spread body serving as an abutment in the linear groove.

The spread body can be formed of one piece. It is also possible for the spread body to made as a package of individual components, arranged in linear succession, made of sheet steel punched as a package. In the latter variant the external shape of the spread element and the creation of the holder bore are considerably simplified as the cutting machining to produce the spread body with a preset cross-section, in particular from a blank of hard material, is more time-consuming and expensive than punching out and packaging individual plate segments.

Suitably the cross-section of the spread body is adapted to the cross-section of the linear groove of the profile rod so that on spreading, practically the entire surface of the spread body lies against the inner wall of the linear groove and thus leads to the greatest possible contact area.

Preferably to facilitate the spreading the spread body has a longitudinal slot. In a preferred design of the perpendicular connection according to the invention, the wedge body is aligned in the spread body with its wedge tip towards the tenon block.

An extremely even distribution of contact forces between the spread body and the linear groove is obtained as the inner surface of the spread body interacting with the wedge body is formed sloping corresponding to the wedge slopes of the wedge body.

Preferably the wedge body is a sleeve with tapered generating surface where the spread body has a tapered inner surface.

To increase the stability of the perpendicular connection, the surface of the spread body facing the inner surface of the linear groove is at least partly roughened, or fitted with protrusions or recesses, in particular grooves, scoring or teeth For a particularly firm and tight-fitting connection, the roughening or protrusions are designed as tips forming barbs.

The perpendicular connection according to the invention is preferably used for constructions with profile rods of aluminium or another alloy The individual parts of the connecting element are preferably made of steel or another hard metal. With this material combination, in particular with toothed surfaces of the spread body, extremely tight-fitting, twist-resistant and stable perpendicular connections are obtained Naturally however the perpendicular connection according to the invention can be used with other materials for the profile rods and components of the connecting element, e.g. plastics or plastic/metal composite materials.

The perpendicular connections according to the invention are particularly suitable for the simple construction of machine frames, working tables, transport lines and similar, from constructions made from individual abutting profile rods which are held together by hidden connecting bolts.

BRIEF DESCRIPTION OF THE DRAWINGS

Further advantages, features and details of the invention will appear from the following description of preferred embodiments and the drawings which show diagrammatically:

FIG. 4 a perspective view of the individual connecting elements before their assembly;

FIG. 5 a perspective view of a spread body;

FIG. 6 a front view of the spread body in FIG. 5 viewed in direction y;

FIG. 7 a cross-section through the spread body in FIG. 5 along line A-B of FIG. 6;

FIG. 8 an enlarged extract from FIG. 7.

DETAILED DESCRIPTION OF PREFERRED EMBODIMENTS

Figure 1:
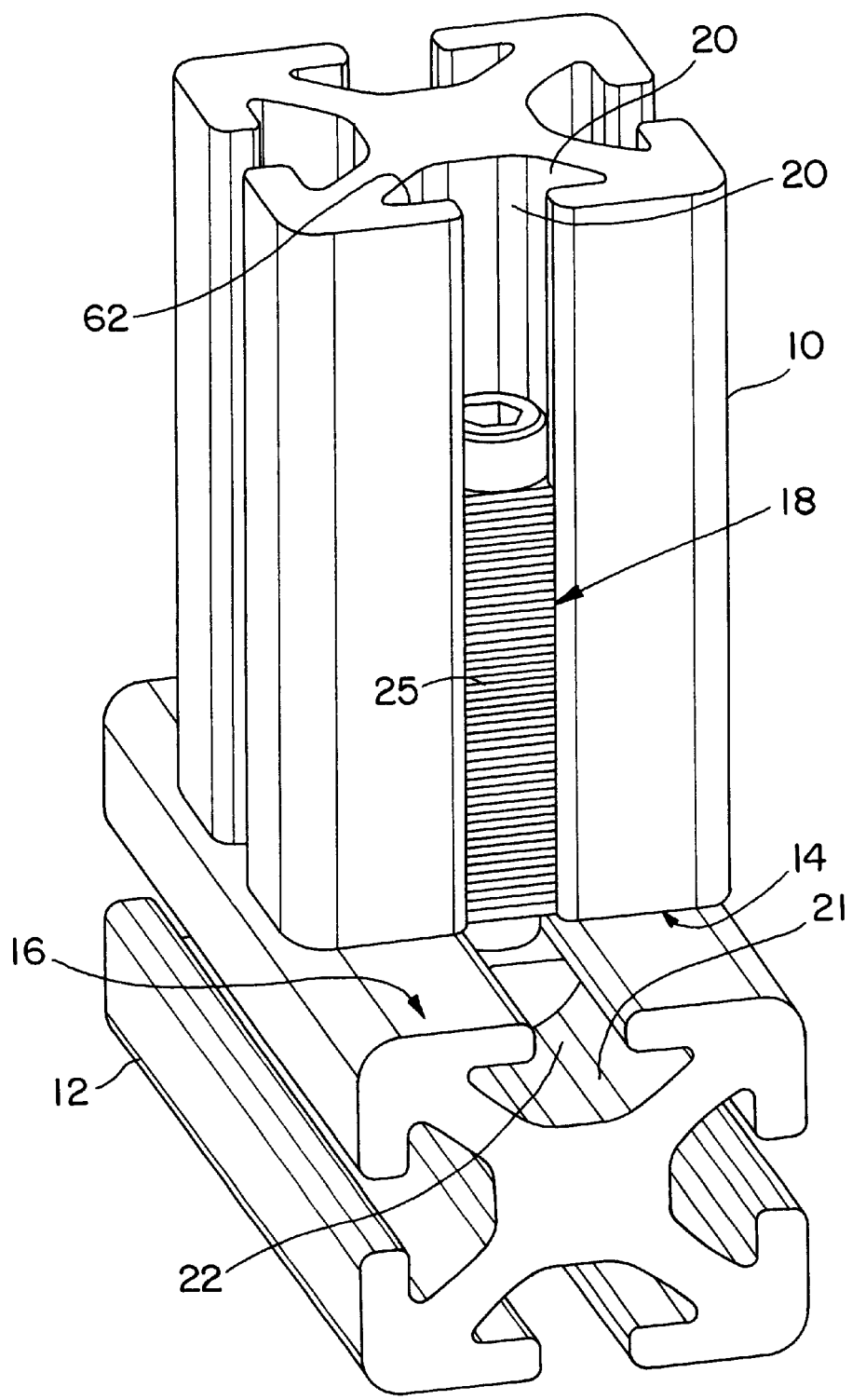
FIG. 1 a perspective view of a perpendicular connection of profile rods.
Figure 2:
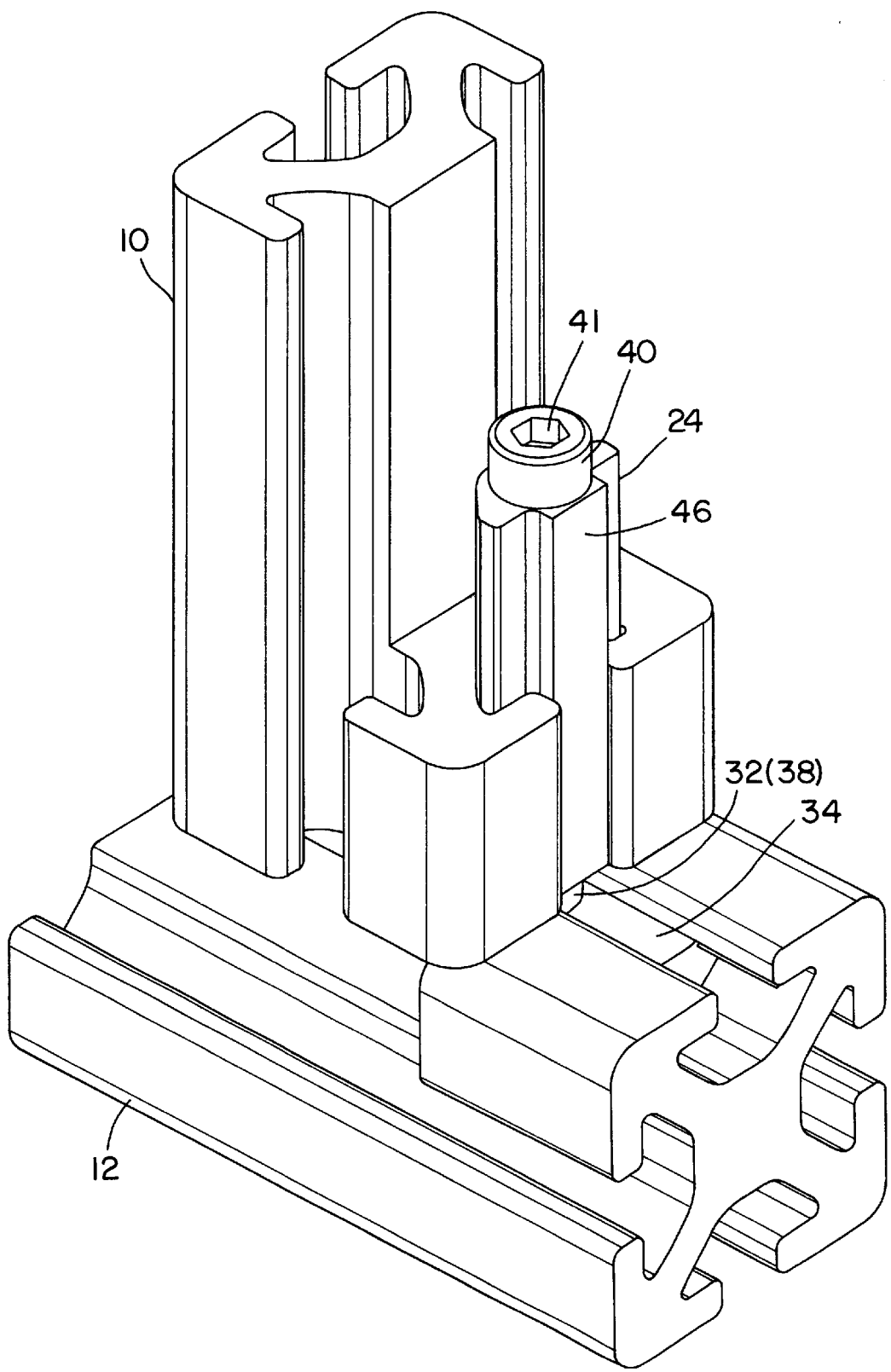
FIG. 2 a perspective view of the perpendicular connection in FIG. 1 in partial cross-section.
Figure 3:
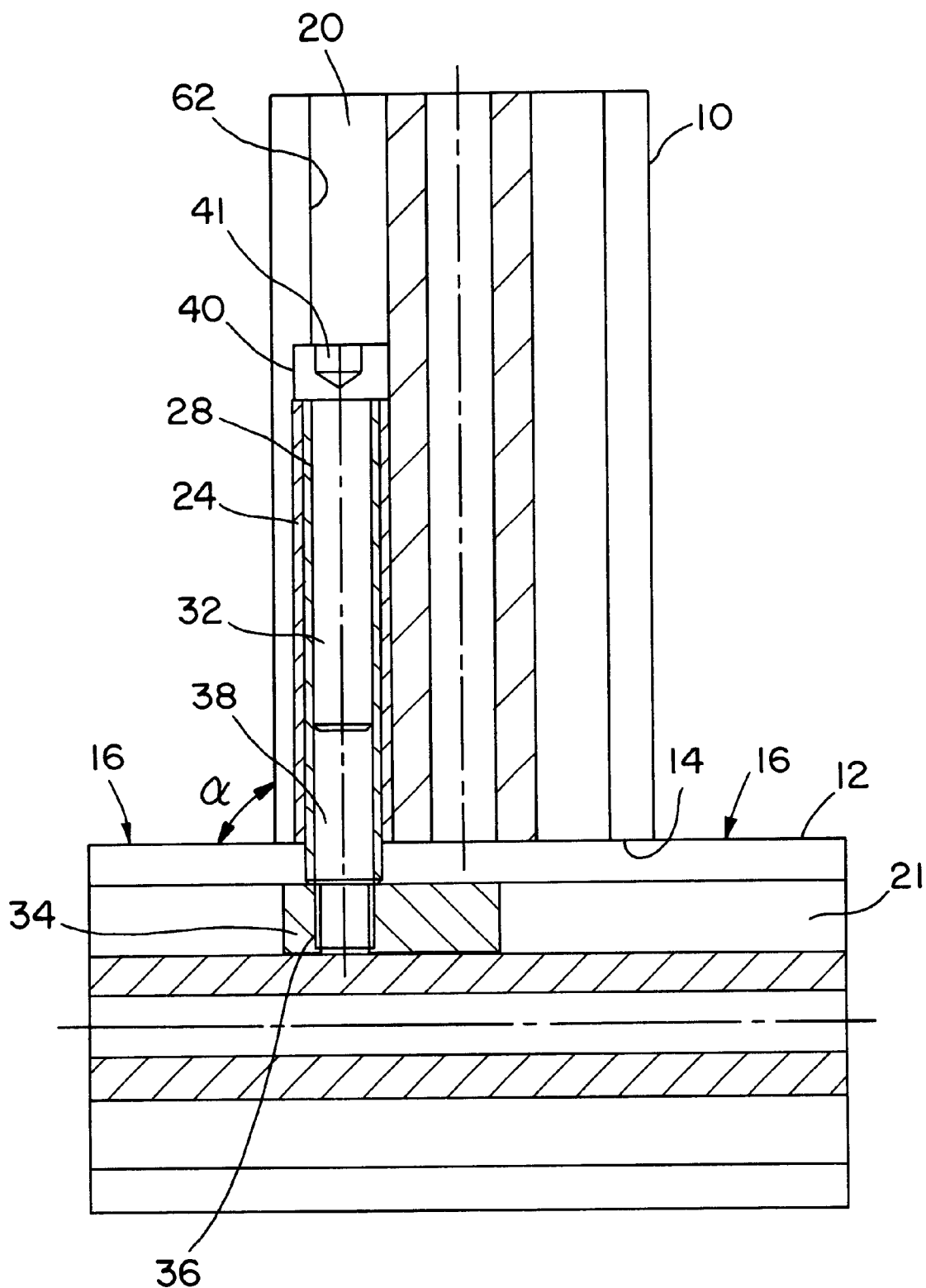
FIG. 3 a cross-section through the perpendicular connection in FIG. 1 in the direction of the linear grooves.

An arrangement shown in FIGS. 1 to 3 comprises two profile rods 10, 12 running perpendicular to each other and abutting at an angle a of α of 90°. Here a face 14 of profile rod 10 lies against an outer surface 16 of the second profile rod 12 running perpendicular to the first profile rod 10. The two profile rods 10, 12 are connected together firmly and twist-resistant by way of a connecting element 18 shown in FIG. 4, consisting of four components.

The profile rods 10, 12 have undercut linear grooves 20, 21 of approximately musnroom-snapea cross-section with opening slots 22 directed towards the profile outer surface 16. Evidently profiles 10, 12 and the undercut linear grooves 20, 21 can have cross-sectional shapes other than those shown in the drawing. Similarly, the profile rods 10, 12 can abut at an angle a deviating from 90°. The advantage of the same cross-sectional shapes of the linear grooves 20, 21 with the same or different profile rod cross-sections is that the connecting elements 18 can be made uniform from identical components.

According to FIG. 4 the connecting element 18 consists of a spread body 24 with axial holder bore 26, a sleeve 28 which can be inserted in the axial holder bore 26, a connecting bolt 32 protruding through the bore 30 in sleeve 28 and a tenon block 34 with a threaded bore 36 for engaging with the screw thread 38 of the connecting bolt 32.

As shown in FIG. 1, the spread body can be made as a package of individual components 25 arranged in succession lengthwise, for example of sheet steel, by punching as a package. The thickness of the individual plate parts 25 is for example 0.8 mm. If on packaging the individual plate segments are twisted alternately by a slight angle against each other, a spread body with the toothed surface described is obtained.

The connecting bolt 32 has a head 40 with an Allen or internal hexagonal recess. The generating surface 42 of the sleeve 28 is tapered in the direction of the tenon block 34, i.e. the external diameter $d_1$ of sleeve 28 facing towards the screw head 40 decreases continuously in the direction of the tenon block 34 to a minimum external diameter $d_2$ opposite the maximum external diameter $d_1$.

The inner surface 44 of the axial holder bore 26 in the spread body 24 is formed tapered corresponding to the tapered generating surface 42 of sleeve 28 in the same direction, i.e. the internal diameter $D_1$ of the axial holder bore 26 of the spread body 24 facing the screw head 40 decreases continuously in the direction of the tenon block 34 to a minimum internal diameter $D_2$ opposite the maximum internal diameter $D_1$. The cross-section of the spread body 24 corresponds in shape to the cross-section of linear groove 20, where a strip 46 integrated in the spread body 24 engages in the opening slot 22 of the linear groove 20. Without spreading, the connecting element 18 is guided with slight play in the linear groove 20. On its side opposite the strip 46, the spread body 24 has a longitudinal slot 48 interrupting the inner surface 44 of the spread body 24.

As shown in FIGS. 5 to 8, the surface 50 of spread body 24 facing the inside of the linear groove 20 is fitted with toothing 52. The individual teeth 54 in the fitted position have tips 56 pointing towards the screw head 40.

On assembly of the profile rods 10, 12, the individual components of the connecting element 18 shown in FIG. 4 are pre-assembled, where it must be ensured that the connecting bolt 32 is screwed to the tenon block without force on the spread body 24. The spread body 24 is then introduced into the profile rod 10 from its face 14 then the tenon block 34 projecting from the face 14 of profile rod 10 is introduced from the front into the linear groove 21 of the profile rod 12 running transverse to profile rod 10 and pushed into the proposed assembly position. The connecting bolt 32 is then tightened using an Allen key or driver, where the screw thread 38 penetrates further into the threaded bore 36 of the tenon block 34.

Under the screw movement, the head 40 of connecting bolt 32 lying on the face 58 of sleeve 28 pushes sleeve 28 through further into the axial holder bore 26 of spread body 24. This expands the spread body 24, i.e. the parts of spread body 24 adjacent to the longitudinal slot 48 are pushed apart. During this spreading process the teeth 54 engage in the inner wall of linear groove 20, Due to the particular shape of teeth 54 with tips 56 directed against the direction of screwing, a barb-like engagement occurs which gives a particularly firm and tight-fitting connection.

In general the tolerances and play between two connecting elements 18 and the inner wall of linear groove 20 should be set so that the sleeve 28, without a spread effect, is pushed into connecting element 18 up to a residual length which corresponds approximately to 10 to 20% of the length of connecting element 18. The maximum clamping effect of the spread body 24 is achieved when the head 40 of the bolt lies on the face 60 of the spread body 24. On further twisting of the connecting bolt 32, the tenon block 34 is pressed against the undercut surfaces 62 of linear groove 21 of the profile rod 12 giving a twist-resistant and stable perpendicular connection of the two profile rods 10, 12.

What is claimed is:

1. A perpendicular connection, which comprises:
   a first and second profile rod, each of which having an axis and undercut linear grooves abutting each other at an angle;
   a connecting bolt having a first end and a second end opposed to said first end, said connecting bolt arranged in the undercut linear groove of said first profile rod and parallel to the axis of said first profile rod;
   a tenon block arranged in the undercut linear groove of the second profile rod, with the second end of said connecting bolt engaging said tenon block;
   a head of said connecting bolt at the first end thereof;
   a spread element in the undercut linear groove of the first profile rod said spread element comprising a spread body with an axial holder bore and a wedge body inserted in said axial holder bore and having a through bore therein for the connecting bolt with the head of said connecting bolt lying against said wedge body; and
   wherein the spread element, under the effect of axial force generated by the connecting bolt, is spread transverse to the linear groove of the first profile rod and firmly clamped therein.

2. A perpendicular connection according to claim 1, wherein the spread body includes individual components arranged in linear succession.

3. A perpendicular connection according to claim 2, wherein said individual components are made from sheet steel.

4. A perpendicular connection according to claim 1, wherein the cross section of the spread body matches the cross section of the linear groove of the first profile rod in which it is located.

5. A perpendicular connection according to claim 1, wherein the spread body includes a longitudinal slot to facilitate spreading.

6. A perpendicular connection according to claim 1, wherein the wedge body includes a wedge tip and wherein the wedge body is aligned in the spread body with its wedge tip towards the tenon block.

7. A perpendicular connection according to claim 1, wherein the wedge body has an outer sloped surface, and the spread body has an inner sloped surface interacting with and corresponding to the sloped surface of the wedge body.

8. A perpendicular connection according to claim 1, wherein the wedge body is a sleeve with a tapered outer surface and the spread body has a tapered inner surface.

9. A perpendicular connection according to claim 1, wherein a surface of the spread body facing an inner surface of the linear groove of the fist profile rod in which it is located is at least one of partly roughened, includes protrusions or recesses, grooves, scoring and teeth.

10. A perpendicular connection according to claim 9, wherein said facing surface of the spread body includes roughening structured as tips forming barbs.

11. A perpendicular connection according to claim 1, wherein said angle is essentially 90°.

* * * * *